April 20, 1965        O. G. PIKL        3,179,431

OBSTACLE-CLIMBING WHEEL CHAIRS

Filed Jan. 29, 1963        6 Sheets-Sheet 1

INVENTOR.
OTTO G. PIKL
BY
LeRoy J. Leishman
AGENT

April 20, 1965  O. G. PIKL  3,179,431
OBSTACLE-CLIMBING WHEEL CHAIRS
Filed Jan. 29, 1963  6 Sheets-Sheet 2

INVENTOR.
OTTO G. PIKL
BY
AGENT

April 20, 1965    O. G. PIKL    3,179,431
OBSTACLE-CLIMBING WHEEL CHAIRS
Filed Jan. 29, 1963    6 Sheets-Sheet 4

INVENTOR.
OTTO G. PIKL
BY
LeRoy J. Leishman
AGENT

April 20, 1965  O. G. PIKL  3,179,431
OBSTACLE-CLIMBING WHEEL CHAIRS
Filed Jan. 29, 1963  6 Sheets-Sheet 6

INVENTOR.
OTTO G. PIKL
BY
LeRoy J. Leishman
AGENT

… … …

United States Patent Office 3,179,431
Patented Apr. 20, 1965

3,179,431
OBSTACLE-CLIMBING WHEEL CHAIRS
Otto G. Pikl, 816½ W. Hillcrest, Inglewood, Calif.
Filed Jan. 29, 1963, Ser. No. 254,658
18 Claims. (Cl. 280—5.2)

The invention herein described pertains to obstruction-climbing vehicles, and more particularly to a wheel chair that will climb such obstacles as steps and stairways.

Wheel chairs have long been available which could be propelled along floors and fairly level terrain by the occupant of the chair, but most wheel chairs have required human assistance from someone outside the chair when the occupant has desired to go up or down a series of steps. Accordingly, the principal object of the present invention is to provide a wheel chair which the average invalid or temporarily incapacitated person can propel up or down a stairway or series of steps without assistance from someone else.

In furthering the principal purpose of my invention, a subsidiary object is to provide a design for the large wheels conventionally used on wheel chairs that will permit the wheels to change their contour from that of a complete circle to one that will be more conformable to steps and stairways.

An additional object in furtherance of the main purpose of this invention is to provide a wheel having a rim composed of segments that may be selectively collapsed, or moved closer to the hub of the wheel, in order to conform the rim somewhat more closely to the contours of stairway steps.

Another principal object of the invention is to provide manually operable means whereby certain portions of the rim segments may move closer to the center of the wheel under the weight of the chair and its occupant.

A further object is to provide cushioning means to assure that the segments that are to be moved toward the center of the wheel under the weight of the chair and its occupant will do so smoothly without bumping or jarring.

Another object is to provide means whereby the segments are automatically restored to their original positions as continuations of the arcs formed by adjacent segments when the chair is to move over level surfaces.

An additional object is to supply means whereby the segments may be prevented from collapsing or moving toward the center after they have been restored to their original positions.

Another object is to provide means whereby the occupant of the chair may readily turn the large wheels to the most favorable angular positions for ascending or descending a series of steps.

An additional object is to provide manually operable means for moving the large wheels of the chair out of engagement with the surface or surfaces on which the wheel has been resting in order that the wheels may be turned freely without causing any forward, backward, upward or downward movement of the chair.

A further object is to supply instrumentalities whereby a pair of rear wheels may be raised or lowered from the surface on which they have previously been resting irrespective of the concurrent engagement of the front wheels with the lower supporting surfaces.

Still another object is to make it possible for the occupant of the chair to raise or lower the front wheels independently of the rear wheels and to do this by means of a control for raising or lowering a caster wheel assembly comprising a rotary means that normally rolls along the floor or other supporting surface.

Another object is to make the occupant's seat a part of a tiltable structure or assembly whose center of gravity along with that of the occupant will move backwards toward the axis of rotation of the rear wheels when the chair is tilted backwards, thus giving the chair greater stability than it would otherwise have when the large rear wheels are at a higher level than the large ones in front of them.

A further object is to provide a transmission or connection between the large front and large rear wheels so that they will turn positively together.

Another objective is to supply manually operable means for selectively "pumping," "jacking," or "rowing" the chair up or down a series of steps under the control of the occupant.

An additional object is to provide manually operable means for reversing the direction in which the vehicle will move upon operation of the mechanism whereby the occupant propels the vehicle.

Still other objects will appear as the specification proceeds.

The embodiment of my invention that I have chosen for purposes of illustration is one in which the chair may be folded for easy transportation. However, the folding features will not be described in the instant application, as they form no part of the present invention per se.

The species of my invention that I presently prefer comprises four large wheels of conventional size and two small pivotable wheels that form a part of a steering assembly.

In most parts of the following description, the only wheels and supporting structure that will be described are those on the right side of the vehicle, as those on the left side are merely the symmetrical counterparts of those on the right side which are pictured in the various figures. The large wheels 1 and 2, FIGS. 1 to 8 inclusive, are carried by shafts 3 and 4, respectively, FIG. 14. These shafts protrude from a housing 5 which contains not only the mounting arrangements for these shafts but also suitable interconnecting means whereby either wheel may drive the other. This interconnecting means, or transmission, will be described in detail later in this specification.

The aforementioned large wheels each comprise a hub 6, FIGS. 1 to 9, inclusive, and 14. Each of these wheels contains four fixed spokes 7, 8, 9 and 10 that are rigidly mounted in the hub 6. Two of these rigidly secured spokes, 8 and 9, may be seen in FIG. 9, which also shows other structural details of the wheel. Four collapsible or telescoping spokes 11, 12, 13 and 14, FIGS. 1 through 8, are each interposed respectively between two of the rigidly mounted spokes. The construction of the telescoping spokes will be explained hereinafter. Suffice it to say now that they telescope into the hub under the control of the passenger occupying the chair and for purposes that will later be explained in detail.

Figures 9, 10, 11, 18, 19, 20, 21:
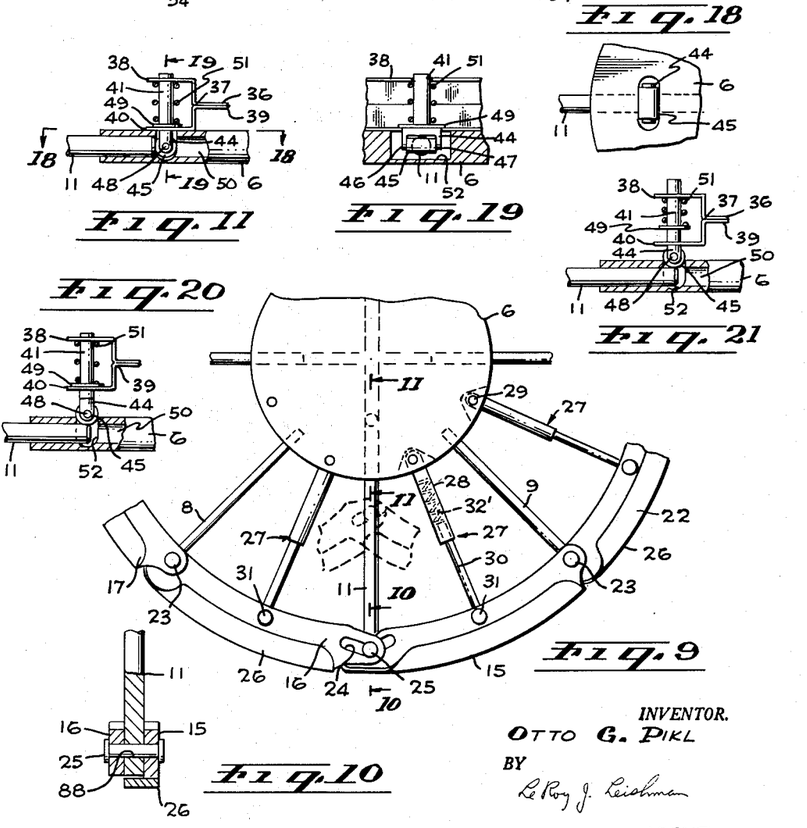
FIG. 9 is a cut-away view of one of the large wheels, revealing some of the structural details.
FIG. 10 is a section taken on line 10—10 of FIG. 9.
FIG. 11 is a section taken on line 11—11 of FIG. 9.
FIG. 18 is a view taken on line 18—18 of FIG. 11.
FIG. 19 is a section taken on line 19—19 of FIG. 11.
FIG. 20 is a view similar to that of FIG. 11, but with the parts shown in operational positions that are different from those pictured in FIG. 11.
FIG. 21 is another view similar to those of FIGS. 11 and 20, but picturing the parts in still different operational positions.

In the illustrated embodiment of my invention the rim of each wheel is composed of eight articulating arcuate segments 15 to 22, inclusive. Each of these segments is pivoted to one of the non-collapsible spokes by means of a pin 23, FIG. 9, which extends through a round hole in the segment. The opposite end of each of these segments in the present embodiment is provided with a slot 24, FIGS. 1, 4 and 9. The slotted ends of the two adjacent segments, such as segments 15 and 16, FIG. 9, are joined by means of a shoulder pin 25 which passes through the slots 24 of the neighboring segments as well as through the hole 88, FIG. 10, of the intervening telescopable spoke. In FIG. 9, the shoulder pin 25 is shown passing through the slots in segment 16, the hole 88, FIG. 10, in the end of collapsible spoke 11, and the slot 24 in segment 15.

The convex side of each of the segments may be covered with resilient material, such as natural or synthetic rubber, to enable the chair to roll silently over the surfaces that it traverses. Such a covering 26 is shown on the segments in FIG. 9.

A bungee or pneumatic shock absorber is provided for each of the segments to cushion the collapsing of the rim. Eight such shock absorbers, one for each segment, are shown on each of the wheels. As illustrated in FIG. 9, the cylindrical or tubular part of each shock absorber is pivotally attached to the hub by a suitable pin 29, and the outer end of each of the cooperating plungers 30 is pivotally attached to the associated rim segment by another pin 31. A compression spring 32′ is confined in each cylinder 28 and expands between the pin 29 and the plunger 30 to assist in urging the associated rim segment outward so that all of the segments together will normally constitute a substantially continuous circle. When a translationally movable spoke and the segments attached thereto move toward the center of the wheel, along with the plungers attached to these segments, the slots 24 of these segments of course slide along the shoulder pin 25 as these parts move from the position shown in full lines in FIG. 9 to the positions there indicated in broken lines.

Figures 14, 17:
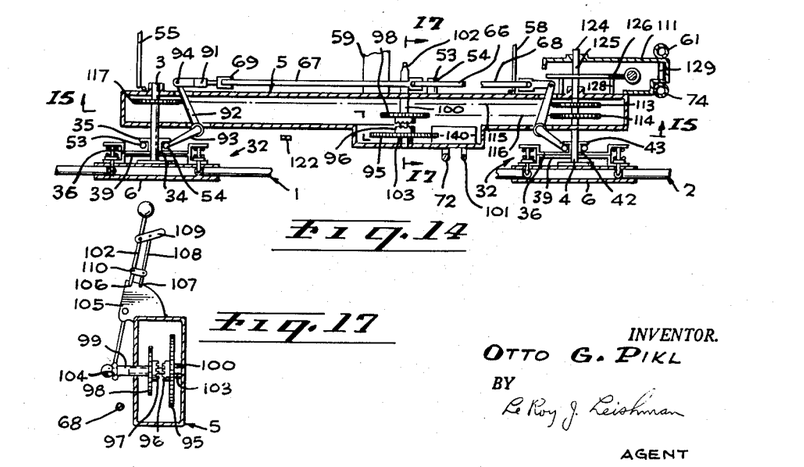
FIG. 14 is a section taken in general on line 14—14 of FIG. 12, but showing a portion of the supporting wheels.
FIG. 17 is a view of teh transmission shifting mechanism, taken on line 17—17 of FIG. 14.

In order to selectively lock the telescopable spokes in their outer postions, or to permit them to move into the hubs at the control of the occupant of the chair under the weight that is resting upon the wheel shafts 3 and 4, each of these shafts is equipped with a locking assembly 32, FIG. 14, that is translationally movable within limits along each of these shafts, two of which are identified in this figure by the numerals 3 and 4. As will be seen in FIG. 14, assembly 32 on shaft 3 is formed with an integral concentric sleeve 34 that surrounds the shaft 3. This sleeve has a flange 35 which is flared out in a direction substantially parallel to the general plane of the assembly 32.

This assembly, in the present embodiment, comprises a plate 36 integrally connected in any suitable manner to the sleeve 32 and extending outward from this sleeve generally in a plane substantially parallel to that of the flange 35. The plate 36 may be circular and have an offset periphery that is uninterrupted, or it may be cut back to form four equally spaced recesses that are spaced from each other by four bracket-like projections 38 formed substantially as indicated in FIGS. 14, 11, 20 and 21, which are offset from the general plane of the plate 36.

If the entire assembly 32 is not cast, then a second plate 39 may be riveted, welded or otherwise suitably attached to the first mentioned companion plate 36. Plate 39 is also provided with four equally spaced bracket portions 40 that are the aligned counterparts of the brackets 38 of plate 36. Each pair or set of brackets 38–40 is provided with aligned holes to slidably support a rod 41 having a yoke 44 integrally attached or formed on the lower end thereof. A roller or ballbearing 45 is interposed between the arms 46 and 47 of the yoke 44. A pin 48, FIGS. 11 and 20, passes through arm 46, the roller or ballbearing 45 and the opposite arm 47. The pin 48 is of course secured against angular or translational movement in one or both of the arms of the yoke 44. If the yoke 44 is formed as shown rather than by providing a recess or notch in the end of rod 41, the aforementioned hole in bracket 40 must be elongated in shape in order to permit the rod 41 with the attached yoke 44 to move from the position shown in FIG. 19 to that illustrated in FIG. 21. A washer or shoulder member 49 is attached to, or formed integrally with, the rod 41; and a compression spring 51 surrounds the shaft 41 and expands between bracket 38 and shoulder member 49 in order to urge the rod 41 to the longitudinal position thereof shown in FIGS. 11, 19 and 20 in which the shoulder member 49 abuts against bracket 40.

Each of the telescoping spokes 11, 12, 13 and 14, FIGS. 1 through 8, is slidably journaled in a hole 50 in the hub 6, FIGS. 11, 20 and 21. Each of these holes 51 communicates with a recess 52, FIG. 19, that extends into the hub from the rear side thereof to movably receive the roller or ballbearing 45. When the assemblies 32 are positioned against the hubs 6, as shown in FIG. 14, the rollers 45, of which there are of course four—one for each of the telescoping spokes—will normally rest within the recesses 52 as shown in FIG. 11 where each of the rollers acts as an abutment to prevent the associated telescoping spoke from moving from the normal position thereof shown in FIG. 11 to a position in which it will extend much further into the hole 50, thus permitting the two rim segments connected to the telescoping spoke to collapse to such positions as are indicated in FIGS. 4 to 8. When the assemblies 32 are moved, by means hereinafter to be explained, away from engagement with the hubs, the rollers or ballbearings 45 will of course be withdrawn from the path of the associated telescoping spoke, as indicated with respect to spoke 11 in FIG. 20, where it will be seen that the spoke is free to pass beyond the roller 45.

Figure 16:
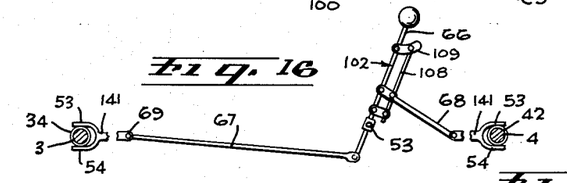
FIG. 16 shows the wheel unlocking linkage with certain portions broken away.

The withdrawal of the four rollers 45 from engagement with the end of the telescoping spokes 11, must of course be controlled by the occupant of the wheel chair. This is accomplished by mechanism illustrated in FIGS. 14, 16 and 12. A lever 66, accessible to the occupant of the chair, is pivoted at 53, FIGS. 14 and 16, on a bracket 54, FIG. 14, and at opposite sides of the pivoting point 53 two links 67 and 68, FIGS. 14 and 16, are pivoted to the lever 66. Link 67 is pivotally connected to the yoke 69 which is integral with link 91, FIG. 14. Link 91 is pivoted at 94 to the arm 92 of an L-shaped lever whose other arm 93 is appropriately connected to the yoke 141, FIG. 16, having two opposite tines or fingers 53 and 54 that straddle the sleeve 34 of the assembly 32, FIG. 14, the sleeve 34, as previously mentioned, being longitudinally slidable on the shaft 3. Through this linkage the assembly 32 moves away from the hub 6 when the lever 66 is moved in one direction; and through the companion linkage and levers attached to link 68, the other assembly 32 on lever 4 is likewise moved away from the other hub 6 which is rigidly attached to the shaft 4.

By means of the structure just described, it will be obvious that when the occupant of the chair pulls the lever 66 back, the interconnected assembly 32 will move away from the hubs with which they are respectively associated with the result that the rollers on the ends of the various rods 41 will move aside from the paths of the ends of the telescoping spokes 11, permitting them to move into the hubs under the weight of the chair and its occupant as will be hereinafter described.

When the occupant of the wheel chair has the use of his hands, the vehicle is usually propelled over level surfaces by means of the rim of the wheel itself, or by means of an auxiliary wheel of smaller diameter that is attached thereto. The stair-climbing vehicle that is disclosed and illustrated herein is propelled along level surfaces in this same manner, but as hereinbefore stated, other means are provided whereby the occupant may propel the vehicle up or down a flight of steps, as will hereinafter be explained.

Figure 15:
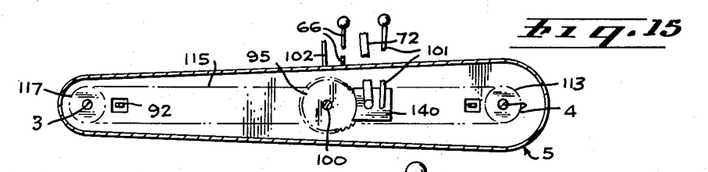
FIG. 15, on the preceding page of the drawings, is a section taken generally on line 15—15 of FIG. 14, with certain parts broken away to show the structure more clearly.

For reasons that will become apparent, it is advisable to disconnect or unclutch the means by which the vehicle is propelled up or down stairs when these means are not in use and when the vehicle is to be propelled by the rims of the front wheels. The ratchet wheel 95, FIGS. 14, 17 and 15, is a part of the mechanism by which the vehicle is moved up or down a series of steps, and I provide it with a positive connection to a clutch mechanism whereby it may be operatively disengaged. The square-toothed clutch member 96, FIGS. 14 and 17, is integrally attached to a ratchet wheel 95 for rotation therewith, and a mating square-toothed clutch member 97 is part of a sleeve assembly that comprises not only member 97 but also a sprocket member 98 and an elongated collar or hub 99, FIG. 17. The ratchet wheel 95 and the integral clutch member 96 are free to rotate on a shaft 100 which is rigidly fixed to the outer wall of the housing 5. Clutch member 96 and ratchet wheel 95 are constrained against movement in one direction by a spacing sleeve 103, and by a collar surrounding the shaft or rod 100 which is rigidly attached to this shaft on the clutch member 96. The assembly 97–98–99 is not only free to rotate on shaft 100 but is also free to move longitudinally thereon within limits. When the square-toothed clutch members 96 and 97 are disengaged as shown in FIG. 17, the driving means for climbing and descending are completely disengaged. The longitudinal movement of the assembly 97–98–99 is controlled by a shift lever 102, FIGS. 12, 14 and 17. This shift lever is provided with means on its lower end for cooperation with an annular groove 104, FIG. 17, near the external end of the elongated hub 99. Accordingly, when the shift lever 102 is in the angular position pictured in FIG. 17, the clutch members 96 and 97 are disengaged, but if lever 102 is moved to a more nearly vertical position, the teeth of the clutch members are positively connected for rotation together. In order to lock the clutch in either of its two positions, a latching arrangement is provided. This comprises a sector plate 105, FIGS. 17 and 12, having two notches 106 and 107 therein, a bar 108, whose lower end fits in either of these notches, and two links 109 and 110, both of which are pivoted at one end to the shift lever 102. These links in turn are pivoted to the bolt or bar 108 so that the bar may move substantially longitudinally. The raising of the handle link 109 lifts the tip of bolt 108 from whichever of the notches 106 or 107 it may be resting in, and permits it to be moved and dropped into the other notch.

Inasmuch as the various controls that we have described must be readily accessible to the occupant of the chair, the general structure of the chair will be described before the actual manipulation of these controls is discussed.

It has already been mentioned that the complete vehicle comprises another assembly like the one that is mounted on and in the housing 5, and that this additional structure is the symmetrical counterpart of the one that has been detailed in connection with the wheels on the right side of the vehicle. There is of course no direct connection between each of the two large rear wheels and between each of the two large front wheels, because any continuation or interconnection between the two front shafts or the two back shafts would make it almost impossible to turn the vehicle for the reason that the wheels negotiating the outside of the curve must turn faster than those traversing the inside of the curve. However, the housing 5 and its counterpart on the left side of the chair must be joined in order to make a unitary frame that will properly support the balance of the structure. It is not possible to have rigid connections between these two housings for the reason that the complete vehicle must be collapsed or folded for easy transportation. Although the folding features of my chair are not a part of the instant invention per se, it is necessary to refer to the folding connectors between the right and left housings in order to define a structure that has the required rigidity. Housing 5 and the corresponding structure (not shown) on the left side of the chair are joined by three pairs of folding arms. The rear-most pair comprises arm 55, FIGS. 12 and 14, which is hinged on a vertical axis to the housing 5, and a second arm 56 similarly connected to the counterpart of housing 5 on the opposite side of the chair. The two arms 55 and 56 are hinged together at 57 in such a manner that the hinge will move back when the chair is folded. A similar pair of arms that fold toward the front of the vehicle comprises arm 58 hinged on a vertical axis to the housing 5, and it will of course be understood that arm 58 is hinged on a vertical axis to a companion arm connected to the opposite housing that is symmetrically arranged with respect to housing 5.

Another pair of arms located between the two sets of folding arms already described is arranged to fold upward. These two arms are hinged together on a horizontal axis at 161, and the right arm 59 of this pair is hinged to the housing 5 for rotation in an upward direction from a position just slightly below a horizontal plane to one in which the lever 59 lies substantially vertical against the side of the housing 5, and it will of course be understood that arm 60, FIG. 12, is similarly mounted on the housing on the left side of the vehicle corresponding to housing 5.

Figure 1:
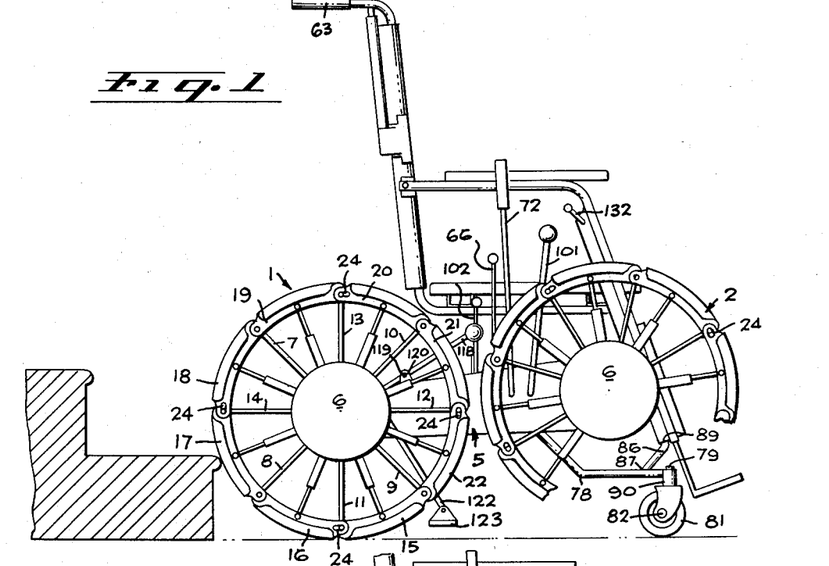
FIG. 1 is a right side elevation of my chair with portions of one of the front wheels cut away in order to show various structural elements of the chair more clearly.
Figure 12:
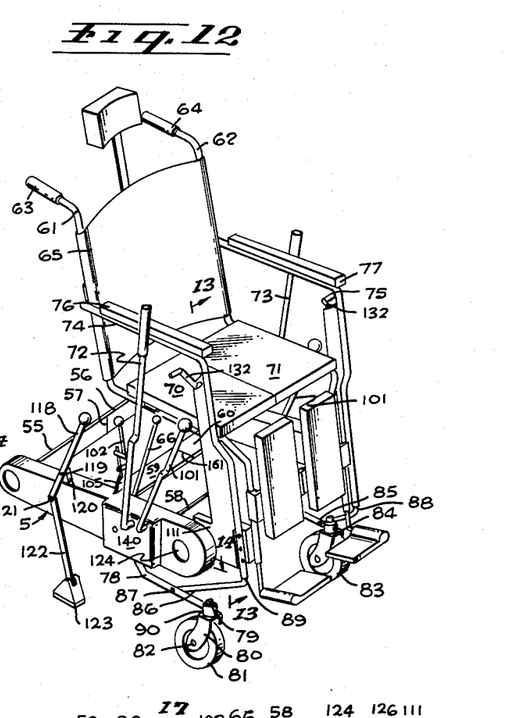
FIG. 12, on the next page of the drawings, is an isometric view of my chair showing the general relationship of some of the components.

The general contour of the chair is determined by a pair of tubular members 61 and 62, FIG. 12, paralleling each other on the right and left sides respectively of the chair and both formed as indicated in this figure and in FIG. 1. The upper ends of these two tubes are bent back to receive two handles 63 and 64, respectively, so that the chair may be pushed or otherwise manipulated by an attendant. The portions of these two tubes immediately below the handle arms form the right and left sides of the back of the chair, and a piece of flexible material, or independent pieces joined together, may be attached thereto for the occupant of the chair to lean against. Such a backrest 65 is shown in FIG. 12.

Below the portions of the tube 61 and 62 on which the backrest is mounted, the tubes, continuing in parallel relationship, form the immediate support for two pivotally or flexibly joined members 70 and 71 that constitute the seat.

Below and beyond the portions of the tubes 61 and 62 that support the seat, the tubes may extend directly or indirectly in a generally downward direction to support the conventional foot and leg rests which will not be further described herein because they are not, per se, a portion of the instant invention.

Two other right and left tubular members 74 and 75 are respectively joined at their upper or rear ends to the portions of tubes 61 and 62 forming the sides of the backrest 65. The two arm rests 76 and 77 are mounted respectively on the generally horizontal portions of the tubes 74 and 75. Tube 74, near its lower end, is bolted to the casing 111 and to tube 61. A short tube 86 is pivoted to the bottom end of tube 74 at 89, and the opposite end of tube 86 is pivoted at 87 to the curved tube 78 whose upper end is pivotally connected to the casing 5. The forward end of tube 78 is connected to member 90 in which the vertical shank or shaft 79 to yoke 80 is pivoted. The yoke or trunnion 80 supports the opposite ends of the horizontal axle 82 on which the small wheel or caster 81 is pivotally mounted. The corresponding left wheel or caster 83 is mounted in a yoke or trunnion 84 pivotally carried on the outer end of the tube 85 which is the left side counterpart of the tube 78 previously described.

Figure 3:
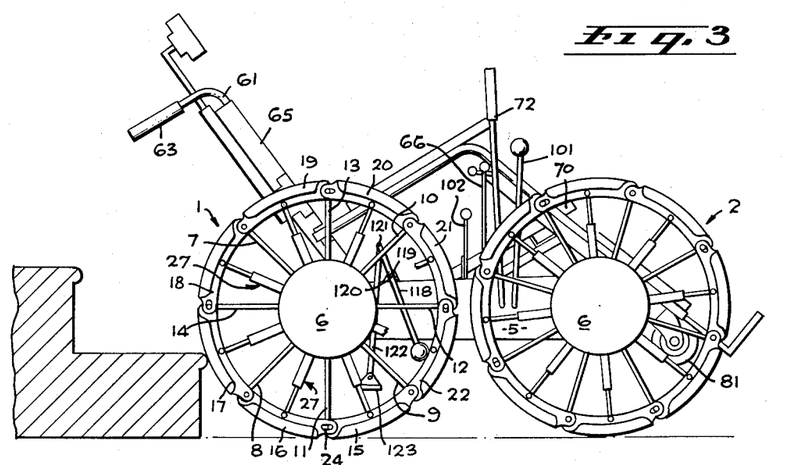
FIG. 3 shows my wheel chair with the seat tilted back and the caster wheels raised out of engagement with the lower supporting surface.
Figure 4:
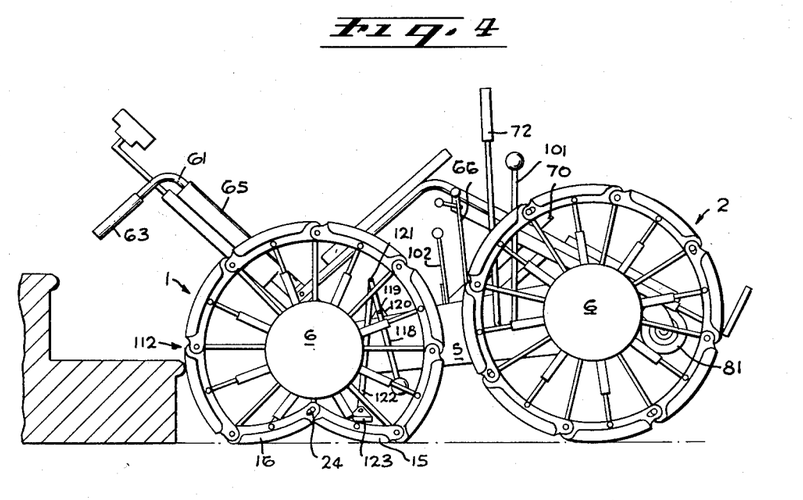
FIG. 4 shows my chair with two of the rear wheel segments partially collapsed in order to bring one of the other rim segments into a more favorable position with respect to the contacting stair step than would otherwise be the case.
Figure 5:
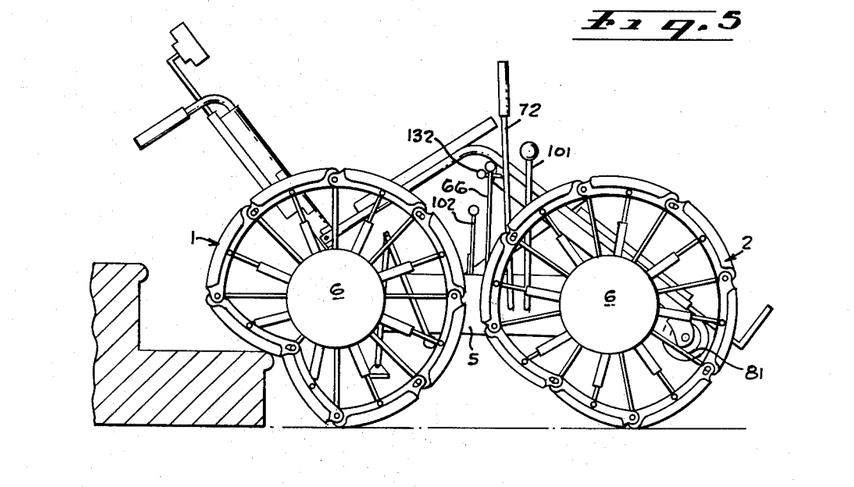
FIG. 5 shows my chair just beginning to climb a stairway step.
Figure 6:
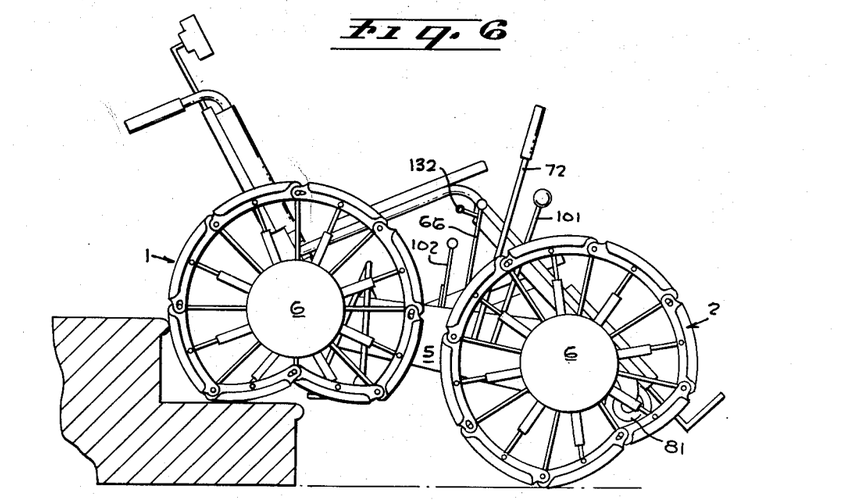
FIG. 6 shows my chair with one of the rear wheels in position to ascend a second step.

When my chair is to ascend a flight of steps, it is advisable that the two rear wheels be positioned against the front of the bottom step in substantially the position indicated in FIG. 3 so that an articulating joint 112, FIG. 4, will be positioned just above the front edge of the lower step when the rear wheels are collapsed as shown in this figure. Inasmuch as the occupant of the chair must necessarily propel the vehicle along level surfaces by means of the rim of the front wheel, rather than the rim of the back wheel (as will doubtless be apparent from an inspection of FIG. 1), it is necessary that the front and rear wheels be positively interconnected by some kind of transmission so that the occupant of the chair can properly index the rear wheel with respect to the steps by his manipulation of the angular position of the front wheel. As previously stated, there is no driving connection between the shafts of the wheels on the right side and the corresponding shafts of the wheels on the left side; but it will be understood that the housing on the left side, which is a counterpart of housing 5 on the right side, encompasses a mechanism like that hereinbefore described in connection particularly with FIGS. 14 and 15, as well as a positive driving connection between the front and rear wheel on the left side of the chair that is a counterpart of the one about to be described within the housing 5 shown in FIGS. 14 and 15.

On shaft 4 to which the right front wheel is mounted, as shown in FIG. 14, two sprockets 113 and 114 are rigidly secured for peripherally receiving the chains or chain belts 115 and 116. The toothed chain or belt 115 passes around and meshes with the sprocket 117 rigidly secured for rotation with the shaft 3 of the rear wheel. The large front and rear wheels shown in FIGS. 1 to 8, inclusive, are thus connected for positive rotation together, and, as a consequence, the rear wheel may be properly positioned or indexed with respect to the steps by rotating the front wheel by means of its rim.

Figure 2:
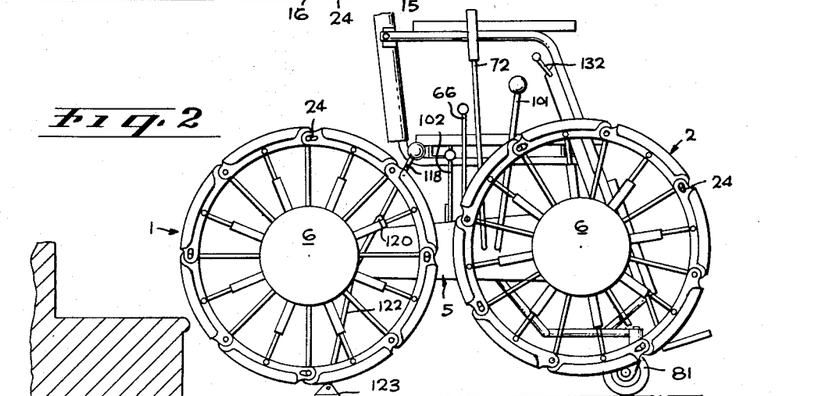
FIG. 2 is a right side elevation of the lower portion of my chair illustrating a part of the means whereby the rear wheels may be moved out of contact of the lower supporting surface.

Before doing this, however, the rear wheel must be raised from the surface on which it is resting. After backing the vehicle so that the rear wheel 1 engages the step, the occupant of the chair raises the lever 118, FIGS. 1, 2 and 12. This lever is pivoted at 119 to a bracket 120 carried on the housing 5. The end of the lever 118 opposite from the operating knob is pivoted at 121, FIGS. 3 and 4, to an arm 122, which pivotally carries a shoe 123 on its lower end. The relative lengths of arm 118 and arm 122 and the position at which arm 118 is pivoted to the bracket 120 are such that the upward movement of the lever or arm 118 causes the shoe 123 to move to the position shown in FIG. 2. Additional angular movement of lever 118 toward a vertical position will cause these levers to move beyond an aligned relationship to an over-center position in which they will lock. This action, of course, raises the rear wheel 1 to the position shown in FIG. 2 in which both the front and the rear wheels will be disengaged from the surface on which they were formerly resting, it being understood that this entire jack assembly has a mating counterpart on the left side of the vehicle so that both of the rear wheels will be simultaneously raised in response to the simultaneous operation of the right and left levers 118. The front wheel 2 on each side of the vehicle, is normally free from engagement with the surface on which the vehicle is resting, as it normally rests on the two small front wheels or casters 81, FIGS. 1, 2 and 12, and the mating caster 83, FIG. 12. Now that all four of the large wheels are free from tractional engagement, the rotation of the two front wheels manually by means of the rim will effect a corresponding rotational movement of the rear wheels. Inasmuch as there is no tie or connection between the wheels on the right and left sides of the vehicle, both of the front wheels must be turned to the proper angular position to assure proper indexing of the articulating joint 112, FIG. 4, with the top surface of the lower step. The occupant of the chair is easily able to effect the necessary indexing of both the rear wheels by aligning one of the rigid spokes with a known position on the vehicle, or by watching to see that he has moved one of these non-telescoping spokes to a position somewhat ahead of vertical as shown in FIG. 2. This will cause the rear wheel to assume the proper angular position to bring one of the articulating joints 112 of the rear wheel into proper relationship with the front of the bottom step of the series of steps that the vehicle is to climb. The occupant of the chair then returns lever 118 to the angular position shown in FIG. 1, which causes the arm 122 and shoe 123 to retract to the position pictured in FIG. 1, thus bringing the rear wheel back into engagement with the surface on which it previously rested.

Before beginning the actual ascent of the stairs, the chair should be tilted back, by means soon to be described, from the position shown in FIG. 2 to the tilted position shown in FIGS. 3 and 4 to shift the center of gravity toward the rear wheels. In this change of position, the seat and its supporting framework all rotate counterclockwise around an axis passing through point 124, FIGS. 12, 13, and 14. This axis may be the center of rotation of an independent shaft 125 axially aligned with the shaft 4, or it may be a continuation of the latter shaft. The worm gear segment 126 is free to rotate around shaft 125 but it is pinned to the housing 5 by means of the pins 127 and 128, FIGS. 13 and 14. The shaft 125 that passes through the worm gear segment 126 also passes through the housing 111 as shown in FIG. 14. The housing 111 has a forwardly projecting bulge that is interposed between the tubes 74 and 61 as shown in FIGS. 12 and 14, and a plurality of bolts 129, 130 and 131 pass through tube 74, the forwardly projecting portion of the housing 111, and the tube 61, as shown in FIG. 14. This bolts the entire right side of the cantilevered seat structure together, and there is of course a symmetrical counterpart of this arrangement on the opposite side of the vehicle.

Figure 13:
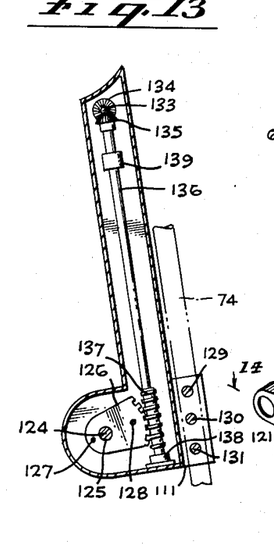
FIG. 13 is a section taken on line 13—13 of FIG. 12.

When the occupant of the chair is ready to ascend a flight of steps, he rotates the crank 132 in a counterclockwise direction, causing its shaft 133, FIG. 13, to drive the attached bevel gear 134 in the same direction. A second bevel or miter gear 135, rigidly mounted on shaft 136, meshes with gear 134, whose counterclockwise rotation causes shaft 136 and worm 137, mounted thereon, to turn in a clockwise direction. The bottom end of shaft 136 is journaled for rotation in the boss 138, and the upper portion is journaled in the bearing block 139. As the worm 137 turns in the worm gear segment 126, the entire seat structure, by virtue of the assembly just described tilts back from the positions shown in FIGS. 1, 2 and 12 to the position indicated in FIG. 3. Inasmuch as the small front pivoted wheels 81 and 83 are carried by this tiltable structure, these caster-like pivoted wheels will consequently be retracted from the lower supporting surface to the position in which they are shown in FIGS. 3 and 4. This brings the large front wheels into engagement with the surface on which the rear wheel 1 and its counterpart on the opposite side of the vehicle have already been resting.

Before beginning the ascent of the stairs, the occupant of the chair moves the clutch members 96 and 97 into meshing engagement. In order to do this, he must first unlock the clutch-shifting lever 102 by lifting arm 109 so that the bar 108 will move out of the notch 107 in the segment 105. The lever may now be moved outward from the position shown in FIG. 12 (or to the left from the position as pictured in FIG. 17), thus causing the sleeve 99 to move toward the ratchet wheel 95 and bring the clutch members 96 and 97 into meshing engagement. The lower end of bar 108 will then fall into notch 106, thereby latching the shift lever 102 in a position that will maintain the clutch members in mesh.

Lever 66, FIGS. 12, 14 and 16, must now be moved toward the rear of the vehicle, thus bringing the lower end of this lever, as pictured in FIG. 16, to the right, carrying link 67 with it. By means of the linkage hereinbefore described, this action moves the assemblies 32, FIG. 14, away from the hubs with which they are respectively associated, causing the various rollers 45 to move out of the paths of the telescoping spokes. The telescoping spokes that are in the lowermost position will now move into the hubs, and the rim segments connected thereto will move toward the hubs, thus permitting each wheel to collapse under the weight of the vehicle and its occupant. The large wheels will now be disposed as shown in FIG. 4.

The ascent of the stairs is of course effected by means of the ratchet wheel 95 and the levers and other mechanism connected therewith, the said mechanism being encased in the small jacket 140, FIGS. 14 and 15. This mechanism comprises a pawl (not shown) that cooperates with the ratchet wheel 95 for turning the ratchet wheel in a counterclockwise direction in much the manner of a conventional jack, excepting that the ratchet teeth are of course on a ratchet gear instead of a ratchet rack; and the descent is effected by means of an escapement much like that used in an automobile jack except that again the motion is rotary instead of longitudinal. When the lever 101 is in one of its two control positions, the lever 72 serves to move a conventional spring-loaded pawl arcuately with respect to the shaft 100, FIG. 15. When the lever 72 is pulled back with a pumping or rowing action, the result is to move the ratchet wheel 95 counterclockwise, and a second pawl (also not shown) prevents the ratchet wheel 95 from moving clockwise as lever 72 is returned to its original position. The control lever 101 operates very much like the short up-or-down lever on the conventional automobile jack, and it must therefore be moved to a second control position to permit the vehicle to come down in successive increments under its own weight, the ratchet wheel being permitted to turn one tooth at a time with each successive stroke of lever 72. This ratchet and escapement type of mechanism is well known and forms no part of the present invention per se, and as a consequence it will not be further described.

The repeated movement of the companion ratchet wheels 95 in response to the strokes of the right and left climbing levers 72 and 73 will move the vehicle up the stairs. It should of course be understood that these levers should be moved in unison. The consequent counterclockwise rotation of the hubs 6 will cause the rear wheel 1 to move from the position in which we last left it in FIG. 4 to the position shown in FIG. 5 and thence to the position illustrated in FIG. 6 where a rim segment is resting on top of the first step with the rim segment just behind it engaging the front edge of the second step.

Figure 7:
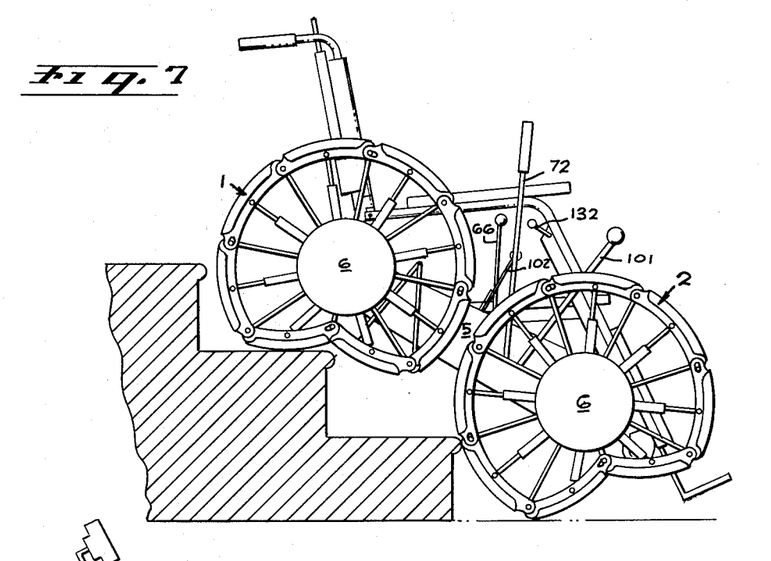
FIG. 7 shows the rear wheels already surmounting the second step and the front wheels beginning the ascent of the first step.
Figure 8:
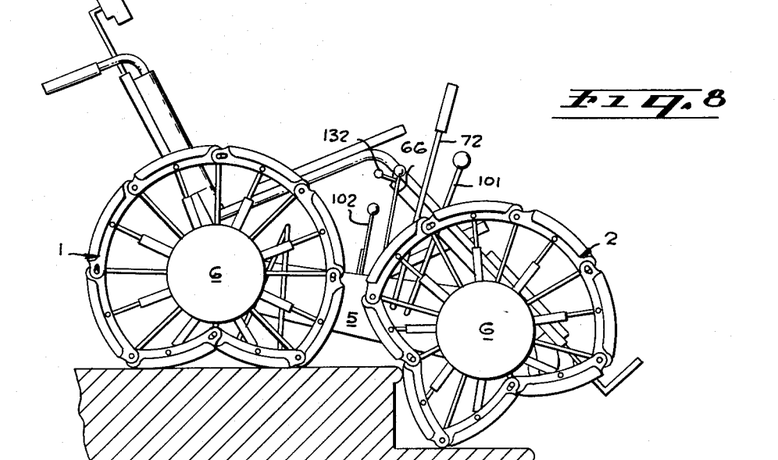
FIG. 8 shows my chair with the front wheels in engagement with the front edge of the top landing of the flight of steps and the rear wheels resting on the top of the said landing.

When the rear wheel 1 is resting on top of the second step, as shown in FIG. 7, the front wheel 2 will be ready to begin the ascent of the bottom step. The wheel 2 will proceed upward in the same manner as did the wheel 1 until finally the front wheel 2 will begin the ascent of the last step after the rear wheel 1 has already reached the top landing as shown in FIG. 8.

In descending, the chair proceeds front forward. With the vehicle poised at the top of the landing, and the seat tilted back, the occupant moves the control lever 101 to the position that shifts the ratchet and pawl mechanism from ascending to descending. It will then operate as an escapement as hereinbefore described, the descent proceeding in increments under the control of the operator by means of the lever 72 and its left side counterpart lever 73. In all other respects, the downward movement is just the reverse of the upward movement, and FIGS. 8, 7, 6, 5, 4 and 3 may be considered in that order as representing successive stages in the descent.

When the vehicle has reached a level surface at either the top or the bottom of the stairs, the occupant lifts the short arm 109, connected to the lever 102, in order to disengage the bolt or bar 108 from notch 107. Lever 102 is then moved from its near-vertical position to the position pictured in FIG. 17 where the bar 108 may again latch in notch 107 of the segment 105. This disengages the clutch gears 97 and 96 thereby freeing the vehicle from the control of levers 72 and 73 so that the occupant may move the vehicle forward and to the right or left by means of the rims of the two front wheels. Before he can begin such propulsion, however, he must move the right and left levers 66 in a clockwise direction in order to bring the assemblies 32 into engagement with the hub 6 by means of the interconnecting linkages. This will move the various bracket assemblies 38–40 from the position shown in FIG. 20 through the position illustrated in FIG. 21 back to that picture in FIG. 11. All of the telescoping spokes connected to rim segments that are not in engagement with the floor will already be in their outermost positions as illustrated in FIG. 11 and in full lines in FIG. 9, the action of the various bungees 27, FIG. 3, having brought this about as a result of the action of the spring 32' shown in FIG. 9. The compression springs 51 in each of the bracket assemblies 38–40, FIGS. 11, 19, 20 and 21 of the assemblies 32, FIG. 14, will force the lower ends of these rods and the rollers 45 on the bottom thereof from the position shown in FIG. 21 to that illustrated in FIGS. 11 and 19. It will be understood, however, that the short shafts or plungers 41 associated with the collapsed rim segments will still be in the position shown in FIG. 21, waiting to be urged to the FIG. 11 position under action of the springs 51 as the large wheels turn to positions in which the weight of the vehicle and its occupant will be shifted to other segments. The segments that have previously been collapsed will then return to their normal positions under action of the bungees 27 when the weight is removed therefrom.

It should be clear from the foregoing description that my vehicle may be moved up or down a flight of stairs under the perfect control of the occupant of the chair and that the vehicle may be propelled along level surfaces by means of the rim segments. Since the wheels on the right and left sides of the structure are not interconnected, the chair occupant may turn the vehicle to the right or left merely by his manipulation of the rims of the front wheels.

Before beginning the propulsion of the vehicle along level surfaces either at the top of the stairs or at the bottom thereof, the occupant will probably like to restore the chair to its upright position. He may of course accomplish this merely by turning the control crank 132 in a clockwise direction.

Various modifications may be made in the structure as hereinbefore described and any of the elements may be transposed or replaced by others performing the same function without departing from the broad spirit of my invention as succinctly set forth in the appended claims.

I claim:

1. In an obstruction-climbing vehicle, a combination including: a seat for a passenger; and means for supporting said seat, said means including at least one pair of relatively large wheels rotatable on substantially aligned axes and at least one additional wheel rotatable on an axis displaced from said aligned axes, each of said relatively large wheels comprising a plurality of non-translationally movable spokes rigidly connected to a common hub, a plurality of translationally movable spokes each interposed between two of said non-translationally movable spokes and each slidably carried by said hub, a plurality of rim segments each having a hole at each end, at least one of said holes being elongated, each of said segments hinged to one of said translationally movable spokes by means of one of said holes and to one of said non-translationally movable spokes by means of the other hole; and means for releasably locking said translationally movable spokes in such position that the ends of the segments attached thereto will be substantially equally distant from the center of the wheel or which they are a part.

2. In an obstruction-climbing vehicle, a combination including: a seat for a passenger; and means for supporting said seat, said means including at least one pair of relatively large wheels rotatable on substantially aligned axes and at least one additional wheel rotatable on an axis displaced from said aligned axes, each of said relatively large wheels comprising a plurality of non-translationally movable spokes rigidly connected to a common hub, a plurality of translationally movable spokes each interposed between two of said non-translationally movable spokes and each slidably carried by said hub, a plurality of rim segments each having a hole at each end, at least one of said holes being elongated, each of said segments hinged to one of said translationally movable spokes by means of one of said holes and to one of said non-translationally movable spokes by means of the other hole, and means for urging said segments to angular positions in which their ends will be substantially equidistant from the center of the wheel of which they are a part.

3. In an obstruction-climbing vehicle, a combination including: a seat for a passenger; and means for supporting said seat, said means including at least one pair of relatively large wheels rotatable on substantially aligned axes and at least one additional wheel rotatable on an axis displaced from said aligned axes, each of said relatively large wheels comprising a plurality of non-translationally movable spokes rigidly connected to a common hub, a plurality of translationally movable spokes each interposed between two of said non-translationally movable spokes and each slidably carried by said hub, a plurality of rim segments each having a hole at each end, at least one of said holes being elongated, each of said segments hinged to one of said translationally movable spokes by means of one of said holes and to one of said non-translationally movable spokes by means of the other hole; means for urging said segments to angular positions in which their ends will be substantially equidistant from the center of the wheel of which they are a part, and means for releasably locking said translationally movable spokes in the positions they occupy when the ends of said segments are in said angular positions.

4. In an obstruction-climbing vehicle, a combination including: a seat for a passenger; and means for supporting said seat, said means including two pairs of relatively large wheels, the wheels of each pair rotatable on substantially aligned axes and at least one additional wheel rotatable on an axis displaced from said aligned axes, each of said relatively large wheels comprising a plurality of non-translationally movable spokes rigidly connected to a common hub, a plurality of translationally movable spokes each interposed between two of said non-translationally movable spokes and each slidably carried by said hub, a plurality of rim segments each having a hole at each end, at least one of said holes being elongated, each of said segments hinged to one of said translationally movable spokes by means of one of said holes and to one of said non-translationally movable spokes by means of the other hole, and means for releasably locking said translationally movable spokes in such position that the ends of the segments attached thereto will be substantially equally distant from the center of the wheel of which they are a part; and a jack for raising and releasably holding one of said pairs of relatively large wheels away from the surface on which they would otherwise rest.

5. In an obstruction-climbing vehicle, a combination including: a seat for a passenger; and means for supporting said seat, said means including two pairs of relatively large wheels, the wheels of each pair rotatable on substantially aligned axes and at least one additional wheel rotatable on an axis displaced from said aligned axes, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, (c) a plurality of rim segments each having a hole at each end, at least one of said holes being elongated, each of said segments hinged to one of said translationally movable spokes by means of one of said holes and to one of said non-translationally movable spokes by means of the other hole; and (d) means for urging said segments to angular positions in which their ends will be substantially equidistant from the center of the wheel of which they are a part.

6. In an obstruction-climbing vehicle, a combination including: a seat for a passenger; and means for supporting said seat, said means including two pairs of relatively large wheels, the wheels of each pair rotatable on substantially aligned axes and at least one additional wheel rotatable on an axis displaced from said aligned axes, each of said relatively large wheels comprising (a) a plurality of non-translationally movable spokes rigidly connected to a common hub, (b) a plurality of translationally movable spokes each interposed between two of said non-translationally movable spokes and each slidably carried by said hubs, (c) a plurality of rim segments each having a hole at each end, at least one of said holes being elongated, each of said segments hinged to one of said translationally movable spokes by means of one of said holes and to one of said non-translationally movable spokes by means of the other hole; (d) means for urging said segments to angular positions in which their ends will be substantially equidistant from the center of the wheel of which they are a part, and means for releasably locking said translationally movable spokes in the positions they occupy when the ends of said segments are in said angular positions.

7. In an obstruction-climbing vehicle, a combination including: a seat for a passenger; and means for supporting said seat, said means including: (1) two pairs of relatively large wheels, the wheels of each pair rotatable on substantially aligned axes that lie in substantially the same plane as the axes of the wheels in the other pair, and (2) an assembly comprising at least one additional wheel rotatable on an axle lying in a plane parallel to that in which said aligned axes are disposed, but displaced therefrom, said axle pivotable about an axis at a right angle to said axle, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, (c) a plurality of rim segments each having a hole at each end, at least one of said holes being elongated, each of said segments hinged to one of said translationally movable spokes by means of one of said holes and to one of said non-translationally movable spokes by means of the other hole; and means for varying the height of said assembly with respect to the surface on which the more remote of said pairs of relatively large wheels may be resting.

8. In an obstruction-climbing vehicle, a combination including: a seat for a passenger; and means for supporting said seat, said means including: (1) two pairs of relatively large wheels, the wheels of each pair rotatable on substantially aligned axes that lie in substantially the same plane as the axes of the wheels in the other pair, and (2) an assembly comprising at least one additional wheel rotatable on an axle lying in a plane parallel to that in which said aligned axes are disposed, but displaced therefrom, said axle pivotable about an axis at a right angle to said axle, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, (c) a plurality of rim segments each having a hole at each end, at least one of said holes being elongated, each of said segments hinged to one of said translationally movable spokes by means of one of said holes and to one of said non-translationally movable spokes by means of the other hole; and (d) means for releasably locking said translationally movable spokes in such position that the ends of the segments attached thereto will be susbtantially equally distant from the center of the wheel of which they are a part and means for varying the height of said assembly with respect to the surface on which the more remote of said pairs of relatively large wheels may be resting.

9. In an obstruction-climbing vehicle, a combination including: a seat for a passenger; and means for supporting said seat, said means including (1) two pairs of relatively large wheels, the wheels of each pair rotatable on substantially aligned axes that lie in substantially the same plane as the axes of the wheels in the other pair, and (2) an assembly comprising at least one additional wheel rotatable on an axle lying in a plane parallel to that in which said aligned axes are disposed but displaced therefrom, said axle pivotable about an axis at a right angle to said axle, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, (c) a plurality of rim segments each having a hole at each end, at least one of said holes being elongated, each of said segments hinged to one of said translationally movable spokes by means of one of said holes and to one of said non-translationally movable spokes by means of the other hole, and (d) means for urging said segments to angular positions in which their ends will be substantially equidistant from the center of the wheel of which they are a part; and means for varying the height of said assembly with respect to the surface on which the more remote of said pairs of relatively large wheels may be resting.

10. In an obstruction-climbing vehicle, a combination including: a seat for a passenger; means for supporting said seat, said means including (1) two pairs of relatively large wheels, the wheels of each pair rotatable on substantially aligned axes that lie in substantially the same plane as the axes of the wheels in the other pair, and (2) an assembly comprising at least one additional wheel rotatable on an axle lying in a plane parallel to that in which said aligned axes are disposed but displaced therefrom, said axle pivotable about an axis at a right angle to said axle, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, (c) a plurality of rim segments each having a hole at each end, at least one of said holes being elongated, each of said segments hinged to one of said translationally movable spokes by means of one of said holes and to one of said non-translationally movable spokes by means of the other hole, (d) means for urging said segments to angular positions in which their ends will be substantially equidistant from the center of the wheel of which they are a part, and (e) means for releasably locking said translationally movable spokes in the positions they occupy when the ends of said segments are in said angular positions; and means for varying the height of said assembly with respect to the surface on which the more remote of said pairs of relatively large wheels may be resting.

11. In an obstruction-climbing vehicle, a combination including: a frame comprising a pair of parallel elongated structures; a first pair of relatively large wheels mounted on the outer side of one of said structures for rotation in substantially the same plane; a second pair of relatively large wheels mounted on the outer side of the other of said structures for rotation in a plane that is substantially parallel to the plane in which the first pair of relatively large wheels rotate, each of the four relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of one of said holes and to one of said non-translationally movable spokes by means of the other hole; and means for releasably locking said translationally movable spokes in such position that the ends of the segments attached thereto will be substantially equally distant from the center of the wheel of which they are a part.

12. In an obstruction-climbing vehicle, a combination including: a frame comprising a pair of parallel elongated structures; a first pair of relatively large wheels mounted on the outer side of one of said structures for rotation in substantially the same plane; a second pair of relatively large wheels mounted on the outer side of the other of said structures for rotation in a plane that is substantially parallel to the plane in which the first pair of relatively large wheels rotate, each of the four relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of one of said holes and to one of said non-translationally movable spokes by means of the other hole; and means for uprging said segments to angular positions in which their ends will be substantially equidistant from the center of the wheel of which they are a part.

13. In an obstruction-climbing vehicle, a combination including: a frame comprising a pair of parallel elongated structures; a first pair of relatively large wheels mounted on the outer side of one of said structures for rotation in substantially the same plane; a second pair of relatively large wheels mounted on the outer side of the other of said structures for rotation in a plane that is substantially parallel to the plane in which the first pair of relatively large wheels rotate, each of the four relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of one of said holes and to one of said non-translationally movable spokes by means of the other hole; means for urging said segments to angular positions in which their ends will be substantially equidistant from the center of the wheel of which they are a part; and means for releasably locking said translationally movable spokes in the positions they occupy when the ends of said segments are in said angular positions.

14. In an obstruction-climbing vehicle, a combination including: a frame comprising a pair of parallel elongated structures; a first pair of relatively large wheels mounted on the outer side of one of said structures for rotation in substantially the same plane; a second pair of relatively large wheels mounted on the outer side of the other of said structures for rotation in a plane that is substantially parallel to the plane in which the first pair of relatively large wheels rotate, each of the four relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of said holes and to one of said non-translationally movable spokes by means of the other hole; and (d) means for releasably locking said translationally movable spokes in such positions that the ends of the segments attached thereto will be substantially equally distant from the center of the wheel of which they are a part; an assembly comprising (a) a seat for a passenger, (b) instrumentalities embodying at least one relatively small wheel rotatable on an axle substantially parallel to the bottom portion of said seat, said axle pivotable about a first axis at a right angle to said axle, (c) means at least indirectly connecting said axle and said seat, and (d) means for pivoting said assembly within limits on a second axis extending through both of said structures, said second axis being substantially parallel to the axis of rotation of said relatively large wheels; and manually operable means for moving said assembly between a first angular position in which the lowest point on said instrumentalities is below the lowest point on the nearest large wheel and a second angular position in which the lowest point on said instrumentalities is disposed above the surface on which said nearest large wheel may be resting.

15. In an obstruction-climbing vehicle, a combination including: a frame comprising a pair of parallel elongated housings each having a pair of spaced, parallel, rotatable shafts extending through the outer side thereof, the shafts that extend through the outer side of at least one of said housings being interconnected for positive rotation together; four relatively large wheels each mounted on one of said shafts and keyed thereto for rotation therewith, each of said relatively large wheels comprising (a) a plurality of non-translationally movable spokes rigidly connected to a common hub, (b) a plurality of translationally movable spokes each interposed between two of said non-translationally movable spokes and each slidably mounted in said hub, and (c) a plurality of rim segments each having a hole at each end, at least one of said holes being elongated, and each of said segments being hinged to one of said translationally movable spokes by means of one of said holes and to one of said non-translationally movable spokes by means of the other hole; means for releasably locking said translationally movable spokes in such positions that the ends of the segments attached thereto will be substantially equally distant from the center of the wheel of which they are a part; and a seat for carrying a passenger, said seat spaced from and carried by said frame.

16. In an obstruction-climbing vehicle, a combination including: a frame comprising a pair of parallel elongated housings each having a pair of spaced, parallel, rotatable shafts extending through the outer side thereof, the shafts that extend through the outer side of at least one of said housings being interconnected for positive rotation together; four relatively large wheels each mounted on one of said shafts and keyed thereto for rotation therewith, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of one of said holes and to one of said non-translationally movable spokes by means of the other hole; a manually operable device for rotating the aforementioned rotatable shafts; means for releasably locking said translationally movable spokes in such positions that the ends of the segments attached thereto will be substantially equally distant from the center of the wheel of which they are a part; and a seat for carrying a passenger, said seat spaced from and carried by said frame.

17. In an obstruction-climbing vehicle, a combination including: a frame comprising a pair of parallel elongated housings each having a pair of spaced, parallel rotatable shafts protruding from the outer side thereof; means individual to each of said housings for so operatively connecting the shafts protruding therefrom that they rotate together; a pair of manually operable devices each individual to one of said housings for rotating the shafts protruding therefrom; four relatively large wheels each mounted on, and keyed to, one of said shafts for rotation therewith, each of said relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of one of said holes and to one of said non-translationally movable spokes by means of the other hole; means for releasably locking said translationally movable spokes in such positions that the ends of the segments attached thereto will be substantially equally distant from the center of the wheel of which they are a part; and a seat for carrying a passenger, said seat spaced from and carried by said frame.

18. In an obstruction-climbing vehicle, a combination including: a frame comprising a pair of parallel elongated housings each having a pair of spaced, parallel, rotatable shafts protruding from the outer side thereof; means individual to each of said housings for so operatively connecting the shafts protruding therefrom that they rotate together; a pair of manually operable devices each individual to one of said housings for rotating the shafts protruding therefrom; four relatively large wheels each mounted on, and keyed to, one of said shafts for rotation therewith; each of said relatively large wheels comprising (a) a plurality of non-translationally movable spokes rigidly connected to a common hub, (b) a plurality of translationally movable spokes each interposed between two of said non-translationally movable spokes and each slidably carried by said hub, and (c) a plurality of rim segments each having a hole at each end, at least one of said holes being elongated, each of said segments hinged to one of said translationally movable spokes by means of one of said holes and to one of said non-translationally movable spokes by means of the other hole; means for releasably locking said translationally movable spokes in such positions that the ends of the segments attached thereto will be substantially equally distant from the center of the wheel of which they are a part; a seat for carrying a passenger, said seat spaced from and carried by said frame; and a pair of manually operable levers each individual to the wheels carried by a different one of said structures for unlocking the translationally movable spokes of said wheels to permit them to telescope into their associated hubs under the weight that is carried by said wheels.

References Cited by the Examiner

UNITED STATES PATENTS

| | | | |
|---|---|---|---|
| 838,228 | 12/06 | Williams | 280—244 X |
| 1,221,226 | 4/17 | Schlopman | 301—47 |
| 1,244,265 | 10/17 | Wargensted | 152—16 |
| 1,343,898 | 6/20 | Beach | 152—16 |
| 1,739,260 | 12/29 | Roe. | |
| 2,765,860 | 10/56 | Church | 280—5.22 X |
| 2,869,614 | 1/59 | Wamsley | 280—211 X |
| 2,931,449 | 4/60 | King | 180—8 |
| 3,104,112 | 9/63 | Crail | 280—5.2 |

A. HARRY LEVY, *Primary Examiner.*

KENNETH H. BETTS, *Examiner.*